United States Patent
Fitch et al.

(10) Patent No.: US 10,491,350 B2
(45) Date of Patent: Nov. 26, 2019

(54) ADAPTIVE REFERENCE SIGNAL PATTERNS

(71) Applicant: British Telecommunications Public Limited Company, London (GB)

(72) Inventors: Michael Robert Fitch, London (GB); Richard Thomas Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/079,794

(22) PCT Filed: Feb. 9, 2017

(86) PCT No.: PCT/EP2017/052869
§ 371 (c)(1),
(2) Date: Aug. 24, 2018

(87) PCT Pub. No.: WO2017/148674
PCT Pub. Date: Sep. 8, 2017

(65) Prior Publication Data
US 2019/0052427 A1  Feb. 14, 2019

(30) Foreign Application Priority Data
Feb. 29, 2016  (EP) .................................... 16157950

(51) Int. Cl.
*H04L 5/00* (2006.01)
*H04L 1/00* (2006.01)

(52) U.S. Cl.
CPC .......... *H04L 5/0048* (2013.01); *H04L 1/0026* (2013.01); *H04L 5/006* (2013.01);
(Continued)

(58) Field of Classification Search
CPC ............................ H04L 5/0048; H04L 5/0053
See application file for complete search history.

(56) References Cited

U.S. PATENT DOCUMENTS

2008/0219361 A1    9/2008  Guey et al.
2010/0220651 A1*   9/2010  Chen ..................... H04L 5/0007
                                                  370/328
(Continued)

FOREIGN PATENT DOCUMENTS

EP    1 542 488 A1    6/2005
EP    2 015 490 A1    1/2009
(Continued)

OTHER PUBLICATIONS

International Search Report, Application No. PCT/EP2017/052869, dated Oct. 4, 2017, 4 pages.
(Continued)

*Primary Examiner* — Zhensheng Zhang
(74) *Attorney, Agent, or Firm* — Amy Salmela (57) ABSTRACT

A mobile terminal in a wireless communications system estimates channel characteristics from transmissions of a base station comprising reference symbols arranged in a first density and distribution. In the event of an impairment in accuracy of channel estimation, the mobile terminal first applies a checking function to determine whether a base station identity conflict is present. If such a conflict is detected, it transmits a report to the base station to initiate a network channel reallocation process to remove the conflict. If no conflict is detected, the base station is instructed to initiate a function to change the density and distribution of the reference symbols. This allows a dynamic system to distinguish between different causes of poor channel quality, allowing adaptation of the transmissions of the base stations in a manner appropriate to the cause identified.

6 Claims, 6 Drawing Sheets (52) U.S. Cl.
CPC .......... *H04L 5/0053* (2013.01); *H04L 5/0085* (2013.01); *H04L 5/0096* (2013.01)

(56) References Cited

U.S. PATENT DOCUMENTS

| | | |
|---|---|---|
| 2011/0038324 A1 | 2/2011 | Park et al. |
| 2011/0149921 A1 | 6/2011 | Shin et al. |
| 2011/0222436 A1 | 9/2011 | Zee et al. |
| 2011/0249597 A1 | 10/2011 | Papadopoulos |
| 2012/0008587 A1 | 1/2012 | Lee et al. |
| 2013/0196675 A1 | 8/2013 | Xiao et al. |
| 2013/0225189 A1 | 8/2013 | Moon et al. |
| 2013/0242902 A1 | 9/2013 | Liu et al. |
| 2013/0303157 A1 | 11/2013 | Tao |
| 2014/0044104 A1 | 2/2014 | Kim et al. |
| 2014/0086085 A1* | 3/2014 | Zheng ................ H04L 5/0048 370/252 |
| 2014/0274079 A1 | 9/2014 | Li et al. |
| 2014/0348012 A1 | 11/2014 | Wu |
| 2015/0229452 A1 | 8/2015 | Nagata et al. |
| 2015/0230210 A1 | 8/2015 | Lee et al. |
| 2015/0282123 A1 | 10/2015 | Miao et al. |
| 2015/0288483 A1 | 10/2015 | Sun et al. |
| 2015/0312010 A1 | 10/2015 | Urabayashi et al. |
| 2016/0020877 A1 | 1/2016 | Koutsimanis et al. |
| 2016/0037491 A1 | 2/2016 | Hwang et al. |
| 2016/0050596 A1 | 2/2016 | Shin et al. |
| 2016/0344487 A1 | 11/2016 | Lee et al. |
| 2016/0345247 A1 | 11/2016 | Kim et al. |
| 2017/0141896 A1 | 5/2017 | Yang et al. |
| 2017/0181127 A1* | 6/2017 | Hampel ................ H04L 5/0048 |
| 2018/0019857 A1 | 1/2018 | Kazmi et al. |
| 2018/0098187 A1 | 4/2018 | Blankenship et al. |
| 2018/0124787 A1 | 5/2018 | Wang et al. |

FOREIGN PATENT DOCUMENTS

| | | |
|---|---|---|
| EP | 2 663 127 A1 | 11/2013 |
| EP | 2 698 935 A1 | 2/2014 |
| EP | 2 985 931 A1 | 2/2016 |
| KR | 2014/0090030 | 7/2014 |
| WO | WO 2008/108710 A3 | 9/2008 |
| WO | WO 2009/099810 A3 | 8/2009 |
| WO | WO 2014/084029 A1 | 6/2014 |
| WO | WO 2014/088195 A1 | 6/2014 |
| WO | WO 2014/168574 A1 | 10/2014 |
| WO | WO 2016/080560 A1 | 5/2016 |
| WO | WO 2017/148672 A1 | 9/2017 |
| WO | WO 2017/148673 A1 | 9/2017 |

OTHER PUBLICATIONS

Written Opinion, Application No. PCT/EP2017/052869, dated Oct. 4, 2017, 6 pages.
U.S. Appl. No. 16/079,726, filed Aug. 24, 2018, Inventor(s): Fitch et al.
U.S. Appl. No. 16/079,759, filed Aug. 24, 2018, Inventor(s):Fitch et al.
International Search Report and Written Opinion for PCT Application No. PCT/EP2017/052865, dated Apr. 4, 2017, 10 pages.
International Search Report and Written Opinion for PCT Application No. PCT/EP2017/052867, dated May 2, 2017, 12 pages.
3GPP TR 36.872 V1.0.1 (Aug. 2013) Technical Report; 3$^{rd}$ Generation Partnership Project; Technical Specification Group Radio Access Network; "Small Cell Enhancements for E-UTRA and E-UTRAN—Physical Layer Aspects" (Release 12); 5 pages; Aug. 2013.
3GPP TSG RAN WG1 Meeting #71; St. Julian's, Malta, Jan. 28-Feb. 1, 2013; R1-130057; CATT, "Overhead reduction for spectrum efficiency improvement" 7.3.5.2 Discussion and Decision; 4 pages.
3GPP TSG-RAN WG1 Meeting #72; St. Julian's, Malta, Jan. 28-Feb. 1, 2013; Intel Corporation, "Evaluation of specific enhancements for improved spectral efficiency"; Agenda Item: 7.3.5.2 Discussion and Decision; 3 pages.
3GPP TSG RAN WG1 Meeting #62, Madrid, Spain Aug. 23-Aug. 27, 2010; R1-104290; Agenda Item: 6.3.2.1 Huawei, "CSI-RS Pattern Signalling", Discussion and decision; 6 pages.
3GPP TSG RAN WG1 Meeting #72 St. Julian's, Malta, Jan. 28-Feb. 1, 2013; R1-130022; Agenda Item: 7.3.5.2; Huawei, HiSilicon, "Analysis and initial evaluation results for overhead reduction and control signaling enhancements", Discussion and Decision; 6 pages.
3GPP TSG RAN WG1 Meeting #83; R1-156462; Anaheim, USA, Nov. 15-22, 2015; Agenda Item: 6.2.6.2.2; Huawei, HiSilicon, "NB-IOT—downlink physical layer concept description", Discussion and decision; 17 pages.
3GPP TSG-RAN Working Group 1 Meeting #55bis; R1-090137; Ljubljana, Slovenia, Jan. 12-16, 2009; Agenda Item: 12.5; Nortel, "Approaches to Optimize DL-MIMO for Nomadic UEs"; Discussion; 3 pages.
Dhakal, et al.; "Adaptive Pilot Placement for Estimation of Vehicle to Vehicle Wireless Channel"; 2013 International Conference on Connected Vehicles and Expo (ICCVE); Irving, Texas; 978-1 4799-2491 2013 IEEE; DOI 10 1109/ICCVE; 4 pages.
Dowler, et al.; "Performance Evaluation of Channel Estimation Techniques for a Mobile Fourth Generation Wide Area OFDM System"; Centre for Communications Research, University of Bristol, Bristol, United Kingdom; 0-7803-7467-3/02 2002 IEEE.
EP Search Report for EP Application No. 16157949.5; dated Aug. 18, 2016; 13 pages.
EP Search Report for EP Application No. 16157948.7; dated May 20, 2016; 10 pages.
EP Search Report for EP Application No. 16157950.3; dated Aug. 19, 2016; 7 pages.
TSG-RAN WG1 LTE Ad Hoc; R1-060087; Helsinki, Finland, Jan. 23-25, 2006; Agenda Item: 5.1.2.2; Ericsson, "E-UTRA downlink reference-signal structure"; Discussion and decision; 4 pages.
GB Examination Report for GB Application No. GB1603500.8; dated Oct. 12, 2018; 2 pages.
GB Examination Report for GB Application No. GB1603504.0; dated Oct. 19, 2016; 7 pages.
GB Examination Report for GB Application No. GB1603506.5.0; dated Aug. 1, 2016; 5 pages.
International Preliminary Report on Patentability for PCT Application No. PCT/EP2017/052865 dated Jun. 27, 2018; 13 pages.
International Preliminary Report on Patentability for PCT Application No. PCT/EP2017/052867 dated Apr. 17, 2018; 19 pages.
Response to GB Examination Report for GB Application No. GB1603506.5; dated Feb. 1, 2018; 5 pages.
GB Examination Report for GB Application No. GB1603500.8; dated Oct. 5, 2016; 5 pages.
GB Examination Report for GB Application No. GB1603504.0; dated Feb. 2, 2018; 12 pages.

* cited by examiner

ADAPTIVE REFERENCE SIGNAL PATTERNS

CROSS-REFERENCE TO RELATED APPLICATION

The present application is a National Phase entry of PCT Application No. PCT/EP2017/052869, filed Feb. 9, 2017, which claims priority from EP Patent Application No. 16157950.3, filed Feb. 29, 2016, each of which is hereby fully incorporated herein by reference.

TECHNICAL FIELD

This disclosure relates to the operation of cellular radio systems with multiple small cells, such as femtocells, typically installed inside buildings where the distances between the base station (eNodeB) and the user terminals are not expected to be greater than about 100 m and the maximum speed of the user terminals is not expected to be greater than about 30 km/hr.

BACKGROUND

In the "long term evolution" (LTE) standard, reference signals (also known as pilot signals) are constantly broadcast by the base-stations. The user terminals receiving them use them to assess the properties of the downlink channel. The LTE system uses different kinds of reference signals, sent from different antenna ports and performing different tasks. These include cell-specific reference signals (or common reference signals), user terminal-specific reference signals (or demodulation reference signals), positioning reference symbols and channel state reference signals.

User terminals estimate the downlink channel characteristics in order to perform equalization before demodulation of the data symbols. If the UE is moving, there will be time and frequency domain effects as follows:

The time domain effect is caused by multipath reflections, whereby the reflections cause disturbances in the amplitude and phase of the signals. Such reflections come from surfaces near to the UE and more distant from the UE, and the difference in time of arrival of the reflected signals generally increases with high eNodeB transmit powers and longer distances between the eNodeB and UE The frequency domain effect is caused by Doppler shift, whereby the frequency of the received signal at the eNodeB will be shifted down if the UE is moving away from it and shifted up if the UE is moving towards it.

This combination of multipath reflections and the Doppler effect produce an effect known as Doppler spreading. So that the UE can correct for these impairments, the base station repeats the reference signals at regular intervals of time (typically 0.5 ms) and of frequency (typically 100 kHz), spreading across the transmitted bandwidth, to allow a UE to detect sufficient reference signals to reconstruct the channel. The reference signals can be thought of as sampling the channel in both the time and frequency domain. The user terminal uses the standard properties of the reference signals to calculate the amplitude and phase correction that should be applied to every non-reference symbol, and it interpolates between the reference signals as part of the calculation.

The standard LTE reference signal pattern is suited to macro-cellular systems where the UE can receive reflections from many kilometers away (a 3 km round trip is a delay of approximately 1 millisecond), and still rebuild the time domain aspects of the channel, and where the UE can be travelling at 300 km/hr and still rebuild the frequency domain aspects of the channel. The reference signals are transmitted all of the time and comprise about one seventh of the maximum output power of the base station.

For small cells, such as indoor femtocells, both the range and speed of user terminals are much smaller. It is therefore possible to reconstruct the channel in both the time and frequency domain with a very much smaller number of samples or reference signals, which reduce the power requirements of the base station, and increases scope to mitigate reference signal pollution, because each base station is using less spectrum for its reference signals.

Significant power savings and efficiency improvements can be realized by adapting the reference symbol density dynamically in this way. However, for this to be done efficiently, the base station needs to be able to determine what reference signal density is appropriate. One factor in determining a suitable reference signal density may be the degree of difficulty experienced by mobile terminals in acquiring the channel transmitted by the base station.

However, difficulty in estimating a channel by a mobile station may have causes unrelated to Doppler spreading. In particular, if base stations are closely spaced there may be interference between reference symbols transmitted by different base stations using the same identity. In such a situation, increasing the symbol density would be counterproductive as it would increase the opportunities for conflict.

SUMMARY

According to a first aspect of the disclosure, there is provided a method of operating a mobile terminal in a wireless communications system, comprising estimating channel characteristics from transmissions of a base station comprising a plurality of data units, using reference symbols carried by some of the plurality of data units arranged in a first density and distribution, for use in channel assessment by the mobile station, monitoring the transmissions for impairment in accuracy of channel estimation, wherein on identifying an impairment, the mobile terminal first determines whether a base station identity conflict is present, and if such a conflict is detected, transmits a report to the base station to initiate a network channel reallocation process to remove the conflict, if such a conflict is not detected, reporting the impairment to the base station to initiate a change to a second density and distribution of the reference symbols.

The disclosure also extends to a computer program element comprising computer program code to, when loaded into a computer system and executed thereon, cause the computer to perform the method specified above, and also extends to apparatus configured to perform such a method.

According to a second aspect, there is provided a mobile communications terminal arranged to receive and respond to signals transmitted by a base station, the signals comprising a plurality of data units, using reference symbols carried by some of the plurality of data units, the mobile communications terminal comprising: a receiver for receiving signals transmitted from a first base station having a first base station identification code, a channel estimation function for interpreting control data in the signals to identify a density and distribution of the reference signals in the received signals, and to use the reference signals to measure properties of the received signals, an assessment function for identifying impairments in accuracy of the channel estimation, an interference identification function for detecting conflicts between signals received from the first base station and signals received from a second base station having the same base station identification code as the first base station, and reporting such transmissions to the assessment function, whereby the assessment function is configured to initiate a network channel reallocation process to reallocate the base stations to different channels if a transmission conflict is identified, and to initiate a change in the signals transmitted from the base station to operate on a second density and distribution of the reference symbols if no transmission conflict is detected.

In some embodiments, the channel characteristics are derived from data contained within a master information block of a data characterizing the signal. The reference signal distributions in the at least first and second distribution patterns are preferably substantially the same in a region of the respective frames adjacent to a master information block, and vary between the distribution patterns in regions of the respective frames remote from the master information block.

Embodiments of the disclosure allow a dynamic system to distinguish between different causes of poor channel quality, allowing adaptation of the transmissions of the base stations in a manner appropriate to the cause identified.

BRIEF DESCRIPTION OF THE DRAWINGS

An embodiment of the disclosure will now be described, by way of example and with reference to the drawings, in which.

DETAILED DESCRIPTION

Figure 1:
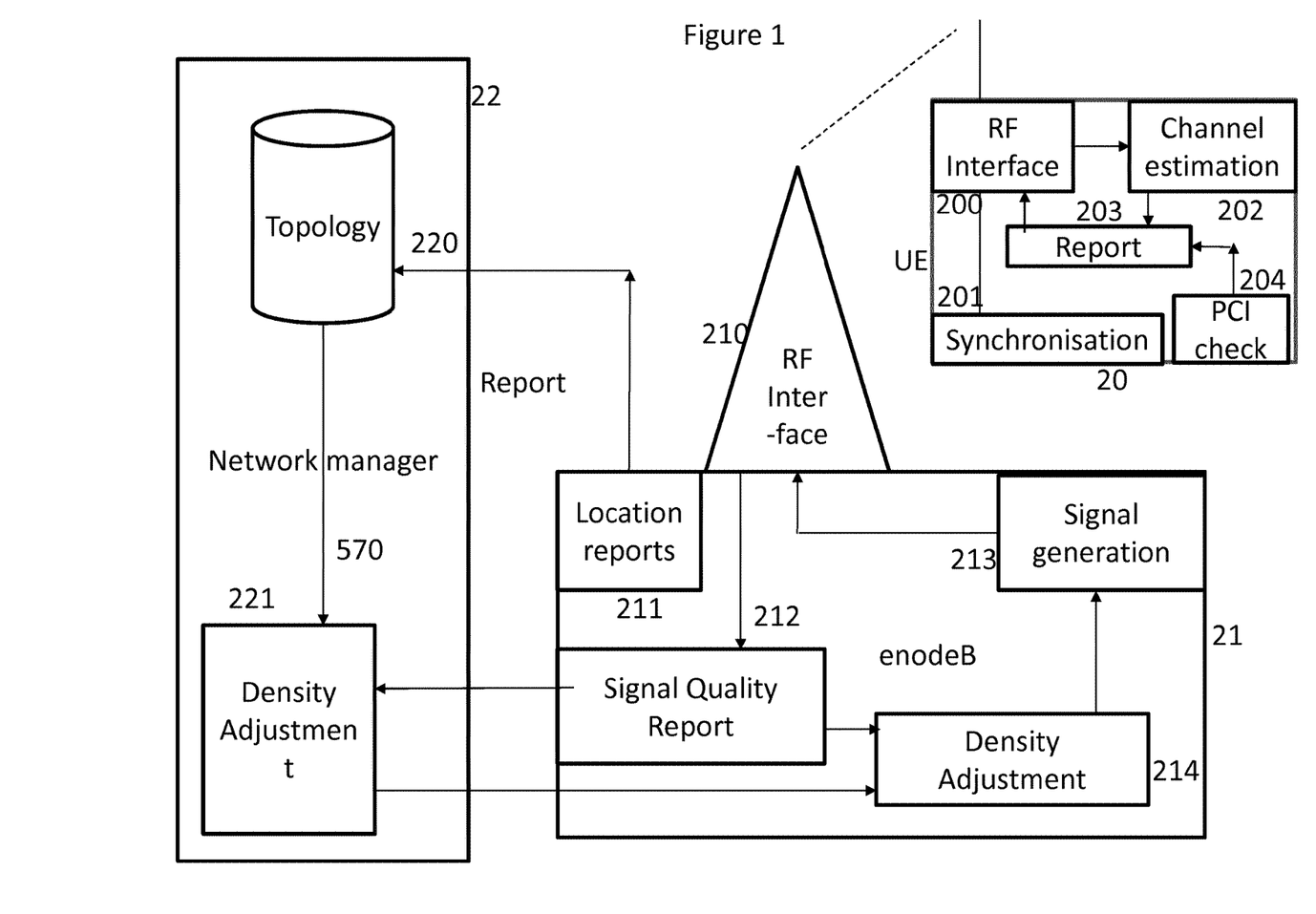
FIG. 1 is a schematic illustrating the physical elements which co-operate in the performance of this embodiment of the disclosure.

FIG. 1 depicts the functional elements operable in the physical components which co-operate in this embodiment. It will be understood that the functional elements may be embodied in software or firmware in the physical devices, and the various functions may share physical elements with each other or with other functions not depicted herein.

A user terminal 20 is in wireless communication with a base station (eNodeB) 21, which is under the control of a network management system 22. It will be understood that in a typical system several base stations will be managed by a network manager, and several user terminals can be in communication with each base station. Only the functions relevant to the operation of this embodiment are depicted in FIG. 1: there would also be standard functions such as power management, coding and decoding, call logging and, in the user terminal, a user interface.

The user terminal functions include an RF interface 200 through which the terminal communicates with base stations such as the one depicted at 21. The functions of the terminal include a synchronization module 201 which monitors transmissions received over the RF interface 200 from the base station 21, to detect synchronization data, and controls transmissions from the user terminal such that they are synchronized with the operation of the base station. There is also a channel estimation function 202 which monitors reference signals and control signals received over the RF interface 200 from the base station 21 in order to determine properties such as signal quality, Doppler shift, etc. The results of such analysis are used by a report generation function 203 to generate a report for transmission via the RF interface 200 to the base station 21. In addition, a physical cell ID interference checking function 204 is provided, which also provides an input to the report function 203.

The base station 21 also comprises an RF interface 210 which communicates with user terminals such as the one depicted at 20. The functional components which contribute to the operation of this embodiment include a location reporting system 211 which co-operates with the network management system 22 to determine the physical location of the base station, in particular in relation to other base stations. The reporting system may make use of absolute position measurement systems like GPS, also detection of other wireless transmitters such as other base stations, and movement detectors which may, for example, indicate that the base station is in a moving vehicle.

The base station includes a signal quality reporting function 212 which, in co-operation with the channel estimation function 202 in the co-operating mobile stations (e.g. 20) can be used to determine handover decisions, selection of appropriate bandwidth and error checking modes etc. The signal quality reporting function also provides an output to the network manager 22.

A further function of the base station 21 is a density adjustment control 214. The base station 21 may control this autonomously in response to the signal quality reports 212, or it may be controlled by instructions received from a density adjustment function 221 of the network manager 22. The density adjustment control system controls the signal generation system 213, specifically by giving instructions on the density of reference symbols to be used in transmission to the user terminals 20. The signal generation system 213 is responsive to this input firstly to generate reference symbols at the required density, and secondly to include a control signal in the master information block (MIB) indicating what density is being used.

The network management system 22 comprises a store 220 of the network topology. This may be maintained manually for planned network changes, such as the erection of a new fixed base station, or a change of channel allocations. However, modern networks include a large number of unstructured changes as users connect and disconnect portable base stations (femtocells) which are not under the direct control of the network operator, and as base stations on moving vehicles such as railway trains move relative to the fixed network. The topology store 220 therefore also uses reports received from the location reporting systems 211 of such base stations 21 to update the topology record.

The network management system also comprises a density adjustment function 221 which receives signal quality and interference reports from the various base stations and returns instructions to their density adjustment functions 214 when a change of reference symbol density is required.

Figure 2:
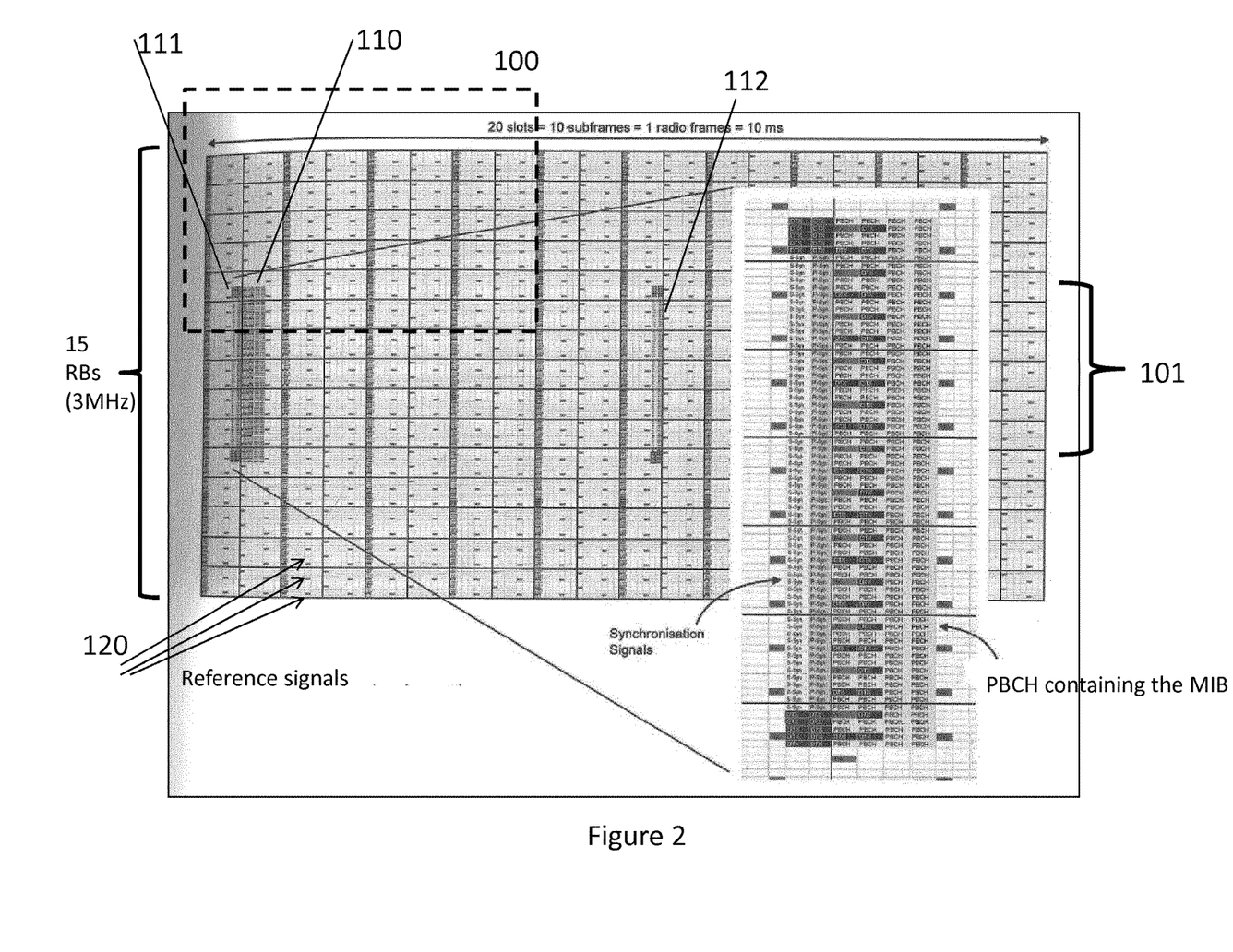
FIG. 2 is an illustration of synchronization signals in a physical broadcast channel containing a master information block (MIB) in an LTE frame according to section 5.2 of TS36.331, release 13 of the 3GPP standard.

FIG. 2 illustrates a typical LTE data frame. Time is represented on the horizontal axis and frequency on the vertical axis. In the frequency domain, the frame has a bandwidth of 3 MHz divided into fifteen resource blocks (RBs), each resource block containing twelve subcarriers. In the time domain, the frame has a duration of 10 ms divided into ten subframes, each containing two time slots (so twenty slots in total), each subframe containing seven symbols. A master information block 110 contains data defining the channel, in particular the physical cell ID (PCI). This block 110 takes up part of seven resource blocks (labeled 101) over part of the second time slot. An inset to FIG. 1 depicts this block in more detail.

Synchronization symbols 111, 112 occur in the first and eleventh time slot, in the same resource blocks as the MIB.

Reference signals are distributed in a regular pattern over the frame, typically two in each time slot in each resource block. The reference signals are shown in FIG. 2 as solid elements (three of them indicated at 120), which occur every seventh symbol in the frequency axis (vertical) and every third and fourth symbol alternately in the time axis (i.e. symbols 1,4,8,11,15, etc.) It will be seen that this pattern continues throughout the frame, including within the block 110 otherwise occupied by the MIB.

Figure 3A:
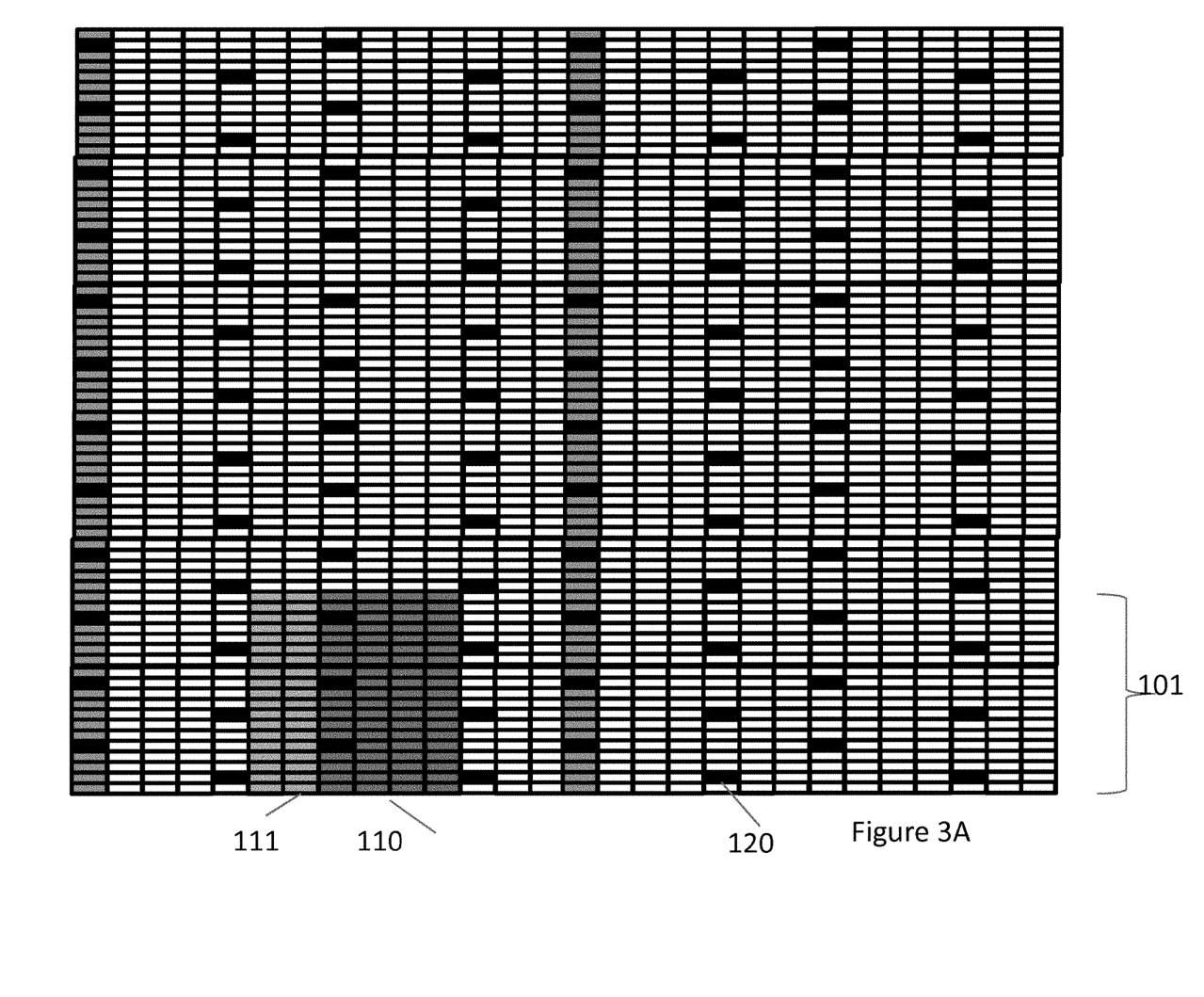
FIGS. 3A, 3B and 3C are enlarged views of part of the frame depicted in FIG. 1, illustrating different densities of reference signals.
Figure 3B:
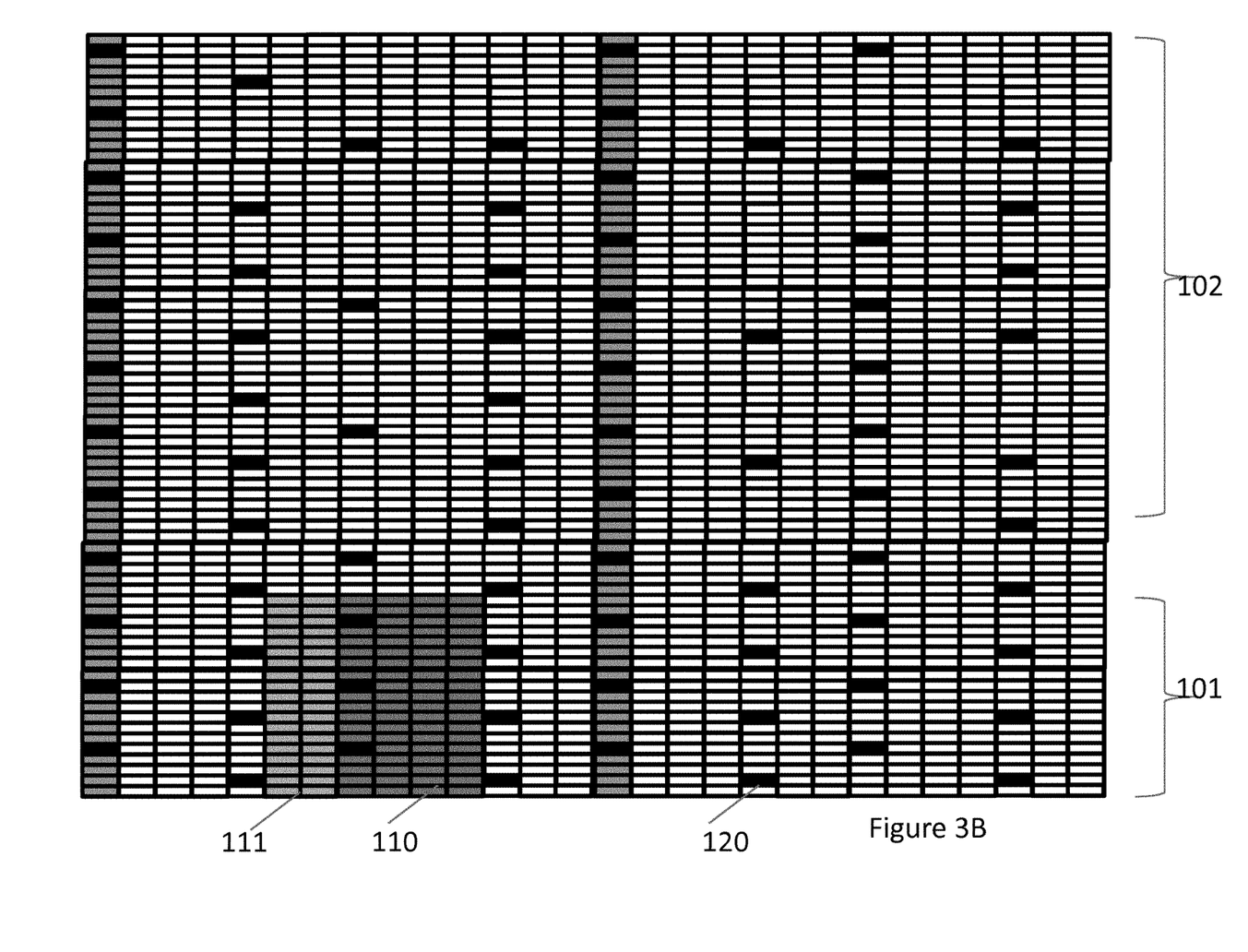
Figure 3C:
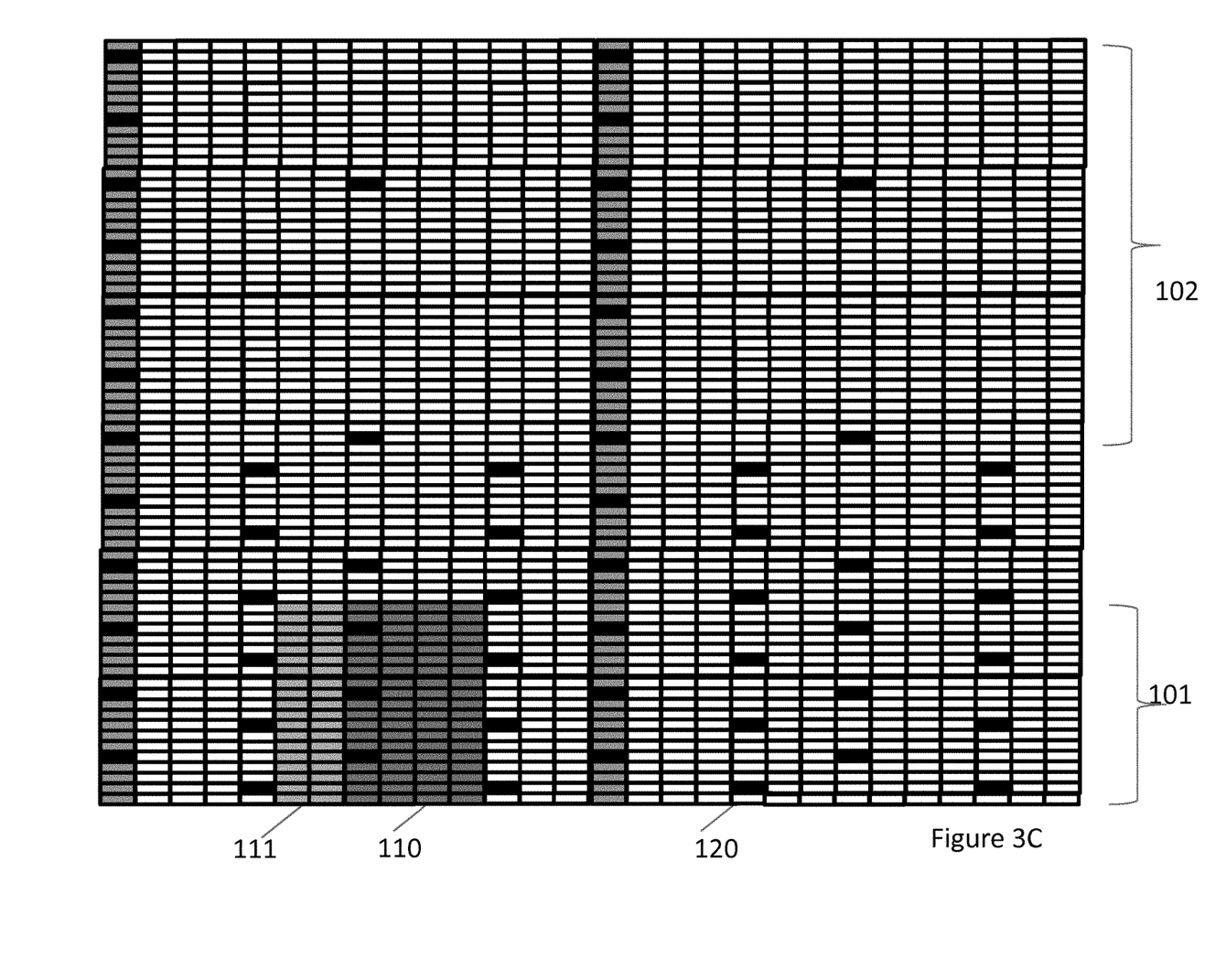

FIG. 3A is an enlarged view of the area of FIG. 1 marked 100, including part of the MIB 110 and the synchronization symbols 111. FIGS. 3B and 3C depict the corresponding area of modified blocks in which the density of reference signals has been reduced. In FIG. 3B the reference signals have been reduced by 25% and in FIG. 3C they have been reduced by 75%. In both cases, the reduction in density only takes place in the resource blocks (frequency bands) 102 that are furthest from the centre frequency. The blocks 101 closest to the centre frequency contain the MIB 110, and the reference symbols in that region are required for the UE to estimate the channel in order that it can decode the MIB. The reference symbol density does not need to be uniform across the non-central symbol area 102, as different UEs can be served from different parts. As depicted in FIGS. 3B and 3C, the density is reduced further in subcarriers more remote from the MIB.

It is envisaged that a few patterns of reference signals, say ½, ⅒, ¹⁄₂₀, ¹⁄₁₀₀ of the maximum density would be available, and a signaling protocol developed to identify the pattern currently in use by the base station, to which the user terminals would operate. In this embodiment, the MIB contains a message informing the terminals whether it is using a sparse or a full set of cell-specific or other reference signals. The MIB as defined in the LTE standard (section 5.2 of 3GPP TS36.331, release 13) has ten spare bits. Four patterns (including the standard density) can be represented by two binary digits in the MIB. A third digit would allow up to eight patterns.

Figure 4:
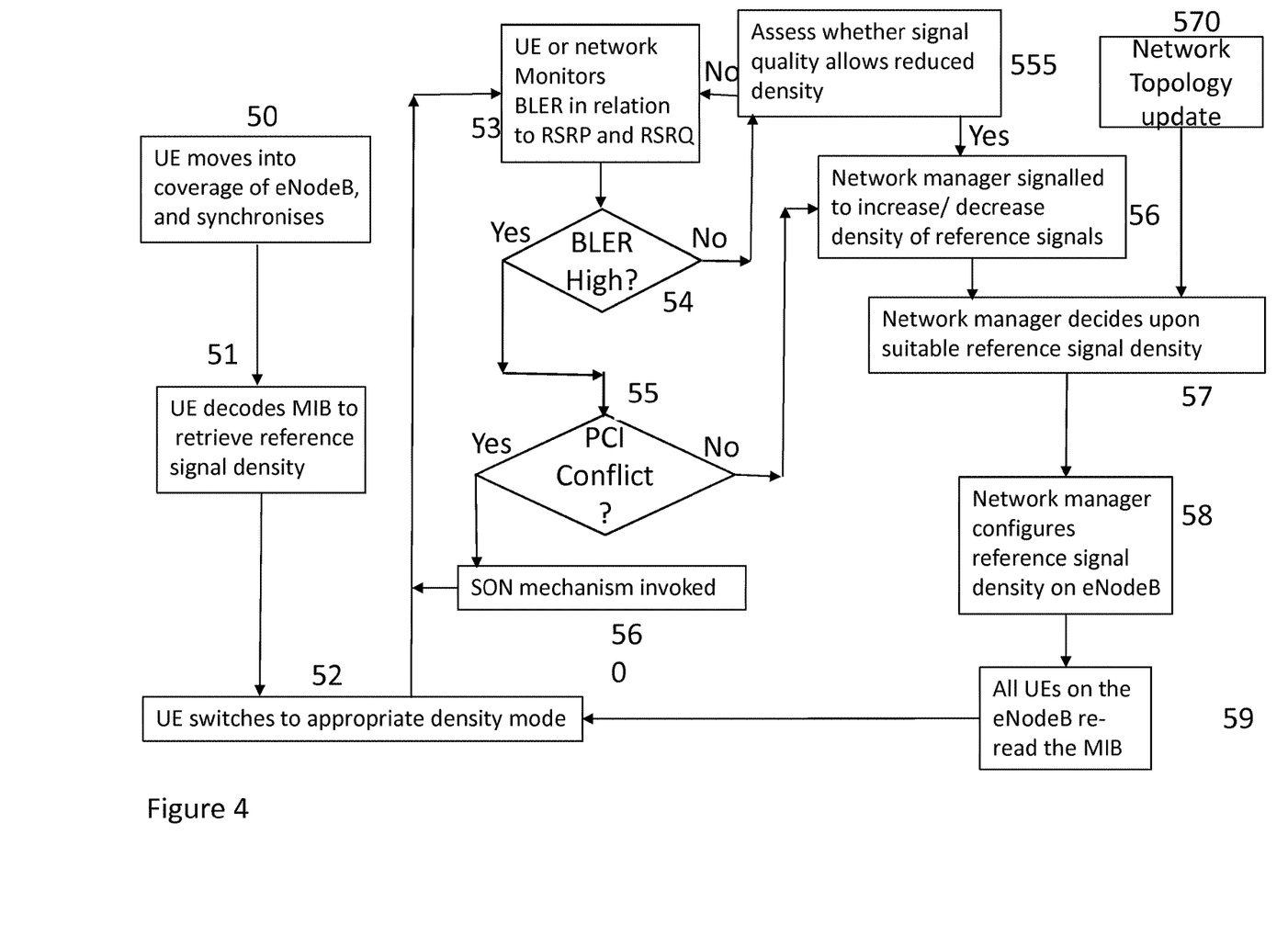
FIG. 4 is a flow chart depicting the process of configuring the reference signal density.

Referring to FIG. 1 and FIG. 4, the process operates as follows:

When a User Terminal 20 synchronizes with a base station 21 (at 50), the synchronization function 201 locks onto the Primary and Secondary Synchronization signals (111,112) transmitted by the base station, in order to deduce the physical cell ID (PCI). After that, the user terminal can make use of the cell-specific reference signals 120 because these reference signals can be descrambled using the PCI. The reason the reference symbols are scrambled for transmission is so that the UE can discriminate between cell-specific reference signals even in areas of overlap between two cells, provided that the PCIs are different.

The user terminal then performs a channel estimation 202 in the region of the Master Information Block (MIB) on the Broadcast Channel (BCH)—at 51. The MIB carries information relating to the bandwidth used by the channel and this is read by the terminal. In this embodiment the MIB includes an indicator of the signal density, and the channel estimation function 202 reads this. From the indicated density, the channel estimation function 202 can determine which symbols in the frame may be used as reference symbols (at 52). It will be understood that, as a symbol location may be used as a reference symbol in some density patterns and not in others, it is necessary for the mobile terminal to identify which pattern is in use in order to determine where the reference symbols are to be found.

Several mechanisms can be used, together or in combination, to set the required density, and these are the subject of the present application and the Applicant's two co-pending International applications, claiming priority from United Kingdom Patent Application Nos. 1603500.8 and 1603504.0, respectively, and European Patent Application Nos. 16157948.7 and 16157949.5, respectively, both filed contemporaneously with this one.

The reference symbol density can be controlled by a density adjustment function 214 in the base station 21 which is responsive to signal quality measurements 212 to control the signal generation function 213 which generates the data frames to be transmitted over the RF interface 210. In particular the density adjustment function 214 instructs the signal generation system 213 where to place the reference symbols, and to apply the required control signal in the MIB to indicate the density in use.

A density adjustment function 221 in the network management system 22 can provide more coordinated control than is possible if each base station acts autonomously, by acting in response to data 220 relating to the deployment topology and reports transmitted from the base station's signal quality monitoring systems 212 relating to the radio environment (at 56). The topology data 220 can be updated from time to time using a reporting function 211 (at 570), or by manual intervention if the topology changes for example by addition or removal of a cell.

The wireless environment monitoring function 212 monitors signals received over the RF interface 210 and reports changes in quality to the density adjustment function 221 in the network management system 22. The network manager 22 queries the radio environment database 220 periodically and selects a suitable reference signal density (at 57). Changes can be triggered by changes in the topology identified by the cell location database or by the mobility management entity (MME). Such changes would include addition or removal of cells, whether by physical movement of a device or by switching it on or off. As has already been discussed, a higher density is required in conditions where Doppler spreading is to be expected, to ensure that the mobile terminal can lock on to one of them. In particular, where base stations are widely spaced and/or in outdoor locations, there are likely to be more long-path reflections and fast-moving mobile terminals, both of which can contribute to channel-spreading effects, in time and frequency, respectively.

Changes in reference symbol density selected by the density adjustment function 221 in the network management system (at 57) are transmitted as instructions to the base station (at 58), where they are used by the density adjustment function 214 to control the signal generation function 213 which generates the data frames to be transmitted over the RF interface 210. In particular the density adjustment function 214 instructs the signal generation system 213 where to place the reference symbols, and to apply the required control signal in the MIB to indicate the density in use.

Another mechanism (at 53-56) is operated by co-operation between terminals and the network. Changes using this mechanism can be triggered if the channel estimation system 202 in a User Terminal 20 is itself able to detect when it is not able to estimate the channel accurately enough, by comparing the BLER in relation to RSRP and RSRQ.

Terminal performance is monitored, for example by detecting an inability to adequately estimate the channel, which can be measured either by the terminal itself or by the network (at 53). One way that the UE or the network can detect when the UE is not able to estimate the channel accurately enough is a high level of block error rate (BLER) when the received signal is strong enough to give a much lower BLER. The symptoms of a high BLER while the RSRP and RSRQ measurements are healthy may indicate an insufficient density of reference signals.

If the error rate is well within acceptable limits the symbol density may be reduced (at 555).

If the UE is failing to estimate the channel, remedial action can be taken, but the cause needs to be identified to determine the appropriate action to take. In particular, a PCI conflict can occur when overlapping cells have the same PCI (physical cell identity), and this can also be a cause of a high BLER, since it would impair the UE from properly estimating the channel as the reference signals are scrambled by another signal using the same PCI. In this embodiment, having identified a high error rate (at 54) the system checks that identity conflict is not the cause (at 55) before the base station is reconfigured to increase the reference signal density (at 56). If a physical cell identity conflict is identified, a self-organizing network (SON) process is invoked (at 560) to initiate a change to the identity code, and the monitoring process 53 is repeated.

It will be noted that if PCI conflict is the cause, increasing the density of the reference symbols would be likely to increase the number of such conflicts, thereby exacerbating the problem. It is therefore desirable to determine whether a PCI conflict is the cause before increasing the reference symbol density.

In the absence of any PCI impairment reports, the report generator 203 transmits a report through the RF interfaces 200, 210 to the signal quality report generator 212, allowing the base station 21 to report to the network manager 22 that an increase in density should be attempted (at 56). The network manager's density adjustment management system 221 can then select a suitable reference signal density (at 57).

When the network manager determines that a change in reference signal density is required (at 57) it passes an instruction to the base station 21 (at 58) causing its density adjustment management system 214 to reduce the number of reference signals generated by the signal generation system 213 according to a predetermined pattern, and to cause the signal generation system 213 to amend the MIB 110 to indicate the pattern of reference signals now in use (at 58). The channel estimation system 202 in each User terminal 20 connected to the base station 21 periodically reads the MIB and so will identify the revised reference signal pattern (at 59), and read the reference signals from the pattern currently being used (at 52).

The process of changing channel density is of course reversible, as changes in network topology or channel estimation values indicate that an increase in density is necessary to maintain signal quality, or that a decrease in density can be achieved without unacceptable impairment in signal quality.

The invention claimed is:

1. A method of operating a mobile terminal in a wireless communications system, comprising:
   estimating channel characteristics from transmissions of a first base station comprising a plurality of data units, using reference symbols carried by some of the plurality of data units arranged in a first density and distribution, for use in channel assessment by the mobile terminal;
   monitoring the transmissions for impairment in accuracy of channel estimation; and
   wherein, on identifying an impairment in the accuracy of channel estimation, the mobile terminal first determines whether conflicts are present between signals received from the first base station and signals received from a second base station having the same base station identification code as the first base station, and
      if such a conflict is detected, transmits a report to the first base station to initiate a network channel reallocation process to remove the conflict, and
      if such a conflict is not detected, reports the impairment to the first base station to initiate a change to a second density and distribution of the reference symbols.

2. A method according to claim 1, wherein the channel characteristics are derived from data contained within a master information block of a data frame characterizing the transmission.

3. A method according to claim 2, wherein in a region of respective data frames adjacent to the master information block at least first and second distribution patterns have reference signal distributions which are the same, and in regions of the respective data frames remote from the master information block, the at least first and second distribution patterns have different reference signal distributions.

4. An apparatus comprising:
   a memory; and
   a processor, the processor is configured to perform the method in accordance with claim 1.

5. A non-transitory computer-readable storage medium storing a computer program element comprising computer program code to, when loaded into a computer system and executed thereon, cause the computer to perform the method as claimed in claim 1.

6. A mobile communications terminal arranged to receive and respond to signals transmitted by a base station, the signals comprising a plurality of data units, using reference symbols carried by some of the plurality of data units, the mobile communications terminal comprising:
   a receiver for receiving signals transmitted from a first base station having a first base station identification code; and
   a processor and memory configured to:
      interpret control data in the signals to identify a density and distribution of reference signals in the received signals, and use the reference signals to measure properties of the received signals for channel estimation,
      monitor performance of the mobile communications terminal by identifying impairments in accuracy of the channel estimation,
      detect conflicts between signals received from the first base station and signals received from a second base station having the same base station identification code as the first base station,
      initiate a network channel reallocation process to reallocate the first base station and the second base station to different channels if a conflict is identified with signals received from the second base station having the same base station identification code as the first base station, and initiate a change in the signals transmitted from the first base station to operate on a second density and distribution of the reference signals if no such conflict is detected.

* * * * *